US010408975B2

United States Patent
Wu et al.

(10) Patent No.: US 10,408,975 B2
(45) Date of Patent: Sep. 10, 2019

(54) QUANTUM ROD LIGHT-GUIDE PLATE

(71) Applicant: BenQ Materials Corporation, Taoyuan (TW)

(72) Inventors: Jian-Hung Wu, Taoyuan (TW); Shih-Wei Chao, Taoyuan (TW)

(73) Assignee: BenQ Materials Corporation, Taoyuan (TW)

(*) Notice: Subject to any disclaimer, the term of this patent is extended or adjusted under 35 U.S.C. 154(b) by 272 days.

(21) Appl. No.: 15/431,787

(22) Filed: Feb. 14, 2017

(65) Prior Publication Data
US 2018/0059302 A1 Mar. 1, 2018

(30) Foreign Application Priority Data
Aug. 31, 2016 (TW) .............................. 105128101 A

(51) Int. Cl.
F21V 13/02 (2006.01)
G02B 1/04 (2006.01)
F21V 8/00 (2006.01)

(52) U.S. Cl.
CPC ............ G02B 1/045 (2013.01); G02B 6/0038 (2013.01); G02B 6/0053 (2013.01); G02B 6/0056 (2013.01); Y10S 977/762 (2013.01)

(58) Field of Classification Search
CPC ......................... G02F 2202/36; G02B 6/0053
See application file for complete search history.

(56) References Cited

U.S. PATENT DOCUMENTS

| 9,146,419 B1* | 9/2015 | Anandan ............... G02B 6/0073 |
| 2006/0227546 A1* | 10/2006 | Yeo ...................... G02B 5/0242 |
| | | 362/227 |
| 2014/0340865 A1* | 11/2014 | Hikmet ............. G02F 1/133533 |
| | | 362/19 |
| 2014/0362556 A1 | 12/2014 | Cho et al. |
| 2017/0123128 A1* | 5/2017 | Wu ........................ G02B 1/02 |

FOREIGN PATENT DOCUMENTS

| CN | 103091892 A | 5/2013 |
| CN | 103792766 A | 5/2014 |
| TW | 201339704 A | 10/2013 |

* cited by examiner

*Primary Examiner* — Andrew J Coughlin
(74) *Attorney, Agent, or Firm* — CKC & Partners Co., LLC

(57) ABSTRACT

Disclosed herein is a quantum rod light-guide plate for a backlight module of a liquid crystal display. The quantum rod light-guide plate includes a light-guide substrate with a side as a light in surface, a prism layer and a quantum rod layer. The prism layer is disposed on a first surface of the light-guide substrate and includes a plurality of parallel strip-shaped prisms extending along an extending direction parallel to the light incident surface of the light-guide substrate. The quantum rod layer is disposed on a second surface of the light-guide substrate opposite to the side of the prism layer, wherein the second surface is a light exiting surface and includes a plurality of quantum rods, wherein the major axes of the quantum rods are aligned along a direction parallel to the extending direction. With the quantum rod light-guide plate, the utilization of the backlight can be increased.

13 Claims, 4 Drawing Sheets

QUANTUM ROD LIGHT-GUIDE PLATE

RELATED APPLICATIONS

This application claims priority to Taiwanese Application Serial Number 105128101, filed on Aug. 31, 2016, which is herein incorporated by reference.

BACKGROUND

Field of Invention

This invention generally relates to a quantum rod light-guide plate used in backlight modules of the liquid crystal display devices for enhancing the gamut and light utilization of the liquid crystal display.

DESCRIPTION OF RELATED ART

Polarizers commonly used in the liquid crystal display are absorptive polarizers. In the liquid crystal display, when the non-polarized light emitted from the backlight passes through the absorptive polarizers, a component of vector of the incident light parallel to the absorption axis direction of the polarizers is absorbed and cannot pass through the absorptive polarizers. Therefore, after the light emitted from backlight passing through the absorptive polarizer, the light will lose at least 50% theoretically. In addition, after the light further passes through structures such as a polarizer, an electrode layer, a color filter, a liquid crystal module and a glass substrate, only less than 10% of the light, which originally emitted from backlight, can be transmitted to the observers. Accordingly, the light utilization of the backlight is quite low and causes waste of energy.

Several approaches to enhance the light utilization of the backlight have been proposed. For example, reflective brightness enhancement film (e.g., Dual Brightness Enhancement Film, DBEF), prism sheet and other optical films may be used in backlight module for continuously reflecting and reusing the light which is unable to pass through the polarizer, in order to redirect the light and let it pass the polarizers to enhance the brightness of the backlight module. In another example, concentrating the light of large viewing angle area of the liquid crystal display can increase the luminance at viewing direction. However, those solutions may increase the luminance of the backlight module but no significant improvement is provided to the gamut and the color saturation of the liquid crystal display.

Therefore, a solution is proposed by using a quantum rod layer in backlight modules to increase the gamut thereof. The quantum rod is a nano-scale semiconductor material and the shape belongs to one-dimensional structure. Because the spectrum of the excitation light of the quantum rod has a narrow full-width-at-half-maximum (FWHM), the gamut of the liquid crystal display using the quantum rod will be more than 100% NTSC. The quantum rod is different from the absorptive polarizer, which absorbs non-polarized light with release of heat. The quantum rod is able to absorb the non-polarized light to emit a polarized light with a wavelength longer than that of the original non-polarized light from the major axis direction thereof. Because of the high internal quantum efficiency, most of the incident light from the backlight source can be transformed to polarized light. The quantum rods are aligned in the direction of major axis, and the emitted polarized light can efficiently passes through the transmission axis of the polarizer disposed on the liquid crystal display. Accordingly, the light utilization of a backlight module with the quantum rod layer will further be enhanced.

However, when the incident light is non-polarized, the efficiency of the polarized light generated by the incident light component in the direction of perpendicular to the arrangement of quantum rods is lower than the incident light component in the direction of parallel to the arrangement of quantum rods actually. The substrate of the additional quantum rod layer will also increase the thickness of the backlight module. Therefore, there is a demand for a quantum rod light-guide plate with integrated quantum rod layer which can generate the polarized incident light into the quantum rod layer in the same direction as the arrangement of quantum rods.

SUMMARY OF INVENTION

According to one broad aspect of the invention, a novel, inventive and useful quantum rod light-guide plate is provided.

The present invention provides a quantum rod light-guide plate including a light-guide substrate with a side as a light incident surface, a prism layer and a quantum rod layer. The prism layer is disposed on a first surface of the light-guide substrate and includes a plurality of parallel strip-shaped prisms extending along an extending direction parallel to the light incident surface of the light-guide substrate, wherein each of the strip-shape prisms has a vertex and a flat bottom surface. The quantum rod layer is disposed on a second surface of the light-guide substrate opposite to the side of the prism layer, wherein the second surface is a light exiting surface, and includes a plurality of quantum rods, wherein the major axes of the quantum rods are aligned with a direction parallel to the extending direction of the plurality parallel strip-shape prisms.

In an embodiment of the quantum rod light-guide plate of the present invention, the prism layer is adjacent to the light guide substrate by the side of the vertex of the strip-shaped prisms.

In an embodiment of the quantum rod light-guide plate of the present invention, the prism layer is adjacent to the light guide substrate by the side of the flat bottom surface of the strip-shape prisms.

In an embodiment of the quantum rod light-guide plate of the present invention, the refractive index of the light-guide substrate is between 1.2 and 1.6.

In an embodiment of the quantum rod light-guide plate of the present invention, the refractive index of the strip-shaped prism is between 1.2 and 1.6.

In an embodiment of the quantum rod light-guide plate of the present invention, the included angles between the inclined surface of the strip-shaped prisms and the plane of the light-guide substrate are between 20+ and 60°.

In an embodiment of the quantum rod light-guide plate of the present invention, the angles between the inclined surface of the strip-shape prisms and the plane of the light-guide substrate vary continuously.

In an embodiment of the quantum rod light-guide plate of the present invention, the material of the prism layer is selected from a group consisting of glass, polymethyl methacrylate, polyethylene terephthalate, cellulose triacetate, polycarbonate, polystyrene, polyolefin and a combination thereof.

In an embodiment of the quantum rod light-guide plate of the present invention, the lengths of the quantum rods are between about 10 nm and 50 nm. The aspect ratios of the quantum rods are between 5 and 10.

In an embodiment of the quantum rod light-guide plate of the present invention, the quantum rods include one or more quantum rods with different lengths.

In an embodiment of the quantum rod light-guide plate of the present invention, the quantum rods include at least one semiconductor material, the material of the quantum rods is a semiconductor material selected from a group consisting of group III-V, group II-VI and group IV-VI compounds and a combination thereof.

In an embodiment of the quantum rod light-guide plate of the present invention, the quantum rod layer is encapsulated by a barrier layer at a side of the quantum rod layer.

In an embodiment of the quantum rod light-guide plate of the present invention, a material of the barrier layer is selected from a group consisting of polyethylene terephthalate, polymethyl methacrylate, epoxy polymer, polysiloxanes fluororesin polymer, glass, metal oxide-containing organic/inorganic composite and a combination thereof.

DETAILED DESCRIPTION

The invention can be more fully understood by reading the following detailed description of the embodiment with reference made to the accompanying drawings that illustrate the invention and it should be noted that the drawings are not to scale and only for illustration only.

The quantum rod light-guide plate of the present invention will now be described in reference to the accompanying drawings. Similar numbers on the drawings refers to the same elements.

Figure 1A:
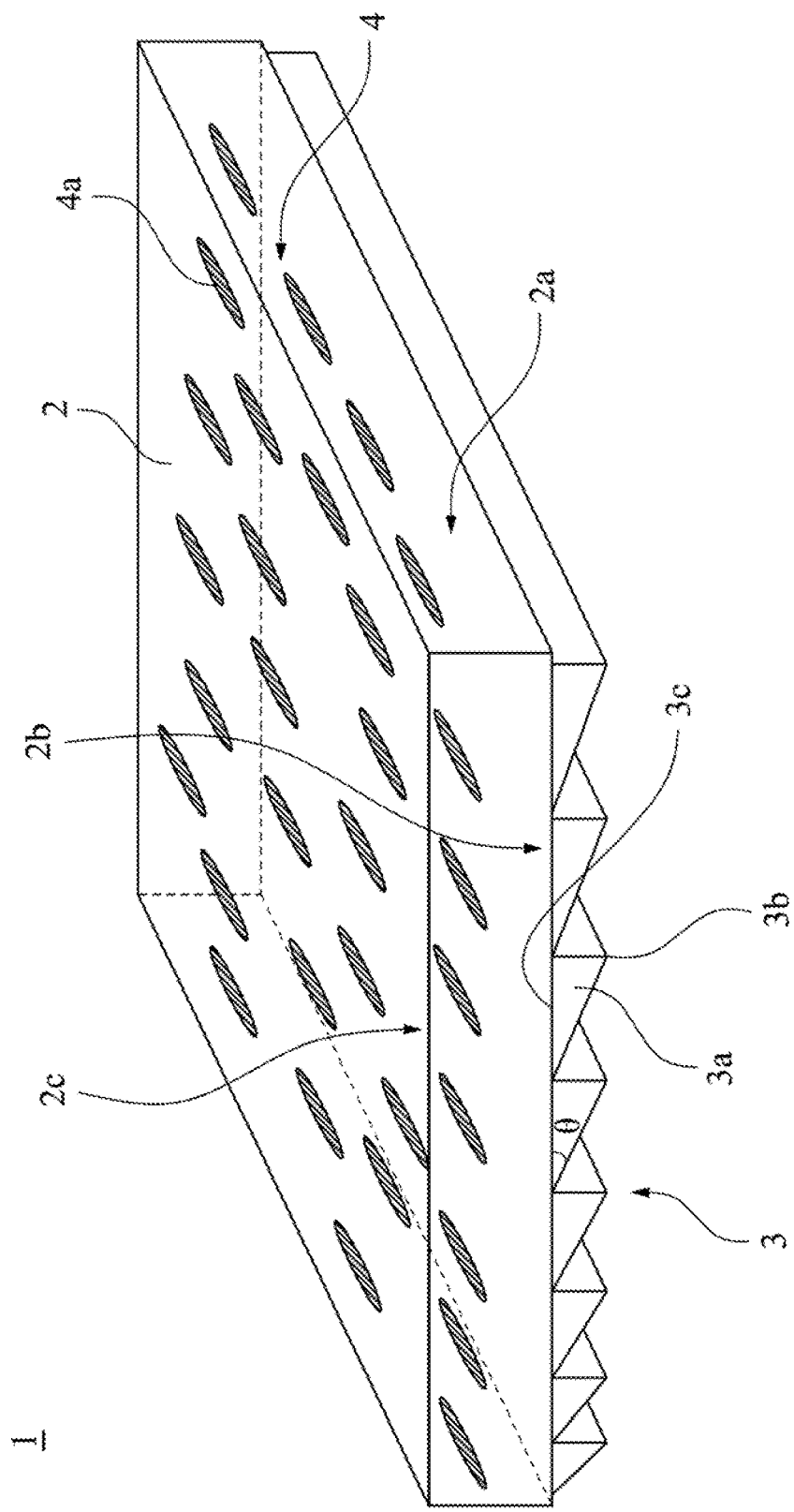
FIG. 1A is a perspective view of a quantum rod light-glide plate in accordance with an embodiment of the present invention.

Now referring to FIG. 1A, it is a perspective view of a quantum rod light-guide plate in accordance with an embodiment of the present invention. In an aspect of the present invention, the quantum rod light-guide plate 1 includes a light-guide substrate 2 with a side as a light incident surface 2a, a prism layer 3 and a quantum rod layer 4. The prism layer 3 is disposed on a first surface 2b of the light-guide substrate 2 and includes a plurality of parallel strip-shaped prisms 3a extending along an extending direction parallel to the light incident surface 2a of the light-guide substrate 2, wherein each of the strip-shaped prisms 3a has a vertex 3b and a flat bottom surface 3c. The prism layer 3 is adjacent to the light-guide substrate 2 by the side of the flat bottom surface 3c of the strip-shaped prisms 3a. The quantum rod layer 4 is disposed on a second surface 2c of the light-guide substrate 2 opposite to the side of the prism layer wherein the second surface 2c is a light exiting surface, and the quantum rod layer 4 includes a plurality of quantum rods 4a, wherein the major axes of the quantum rods 4a are aligned with a direction parallel to the extending direction of the plural strip-shaped prisms 3a.

Figure 1B:
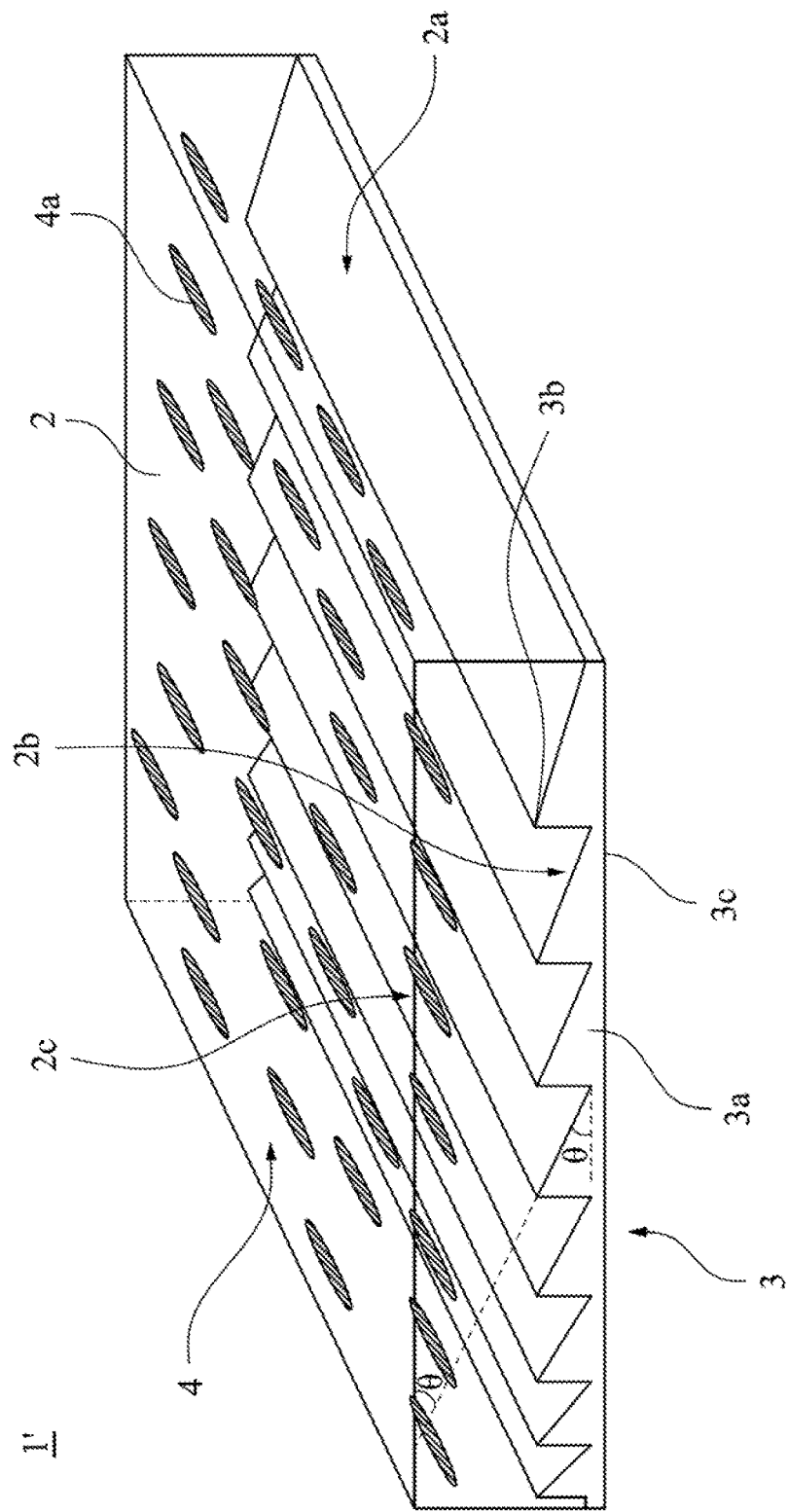
FIG. 1B is a perspective view of a quantum rod light-guide plate in accordance with another embodiment of the present invention.

Referring to FIG. 1B, in another aspect of the quantum rod light-guide plate 1' of the present invention, the prism layer 3 is adjacent to the light guide substrate 2 by the side of the vertex 3b of the strip-shaped prisms 3a.

Figure 2A:
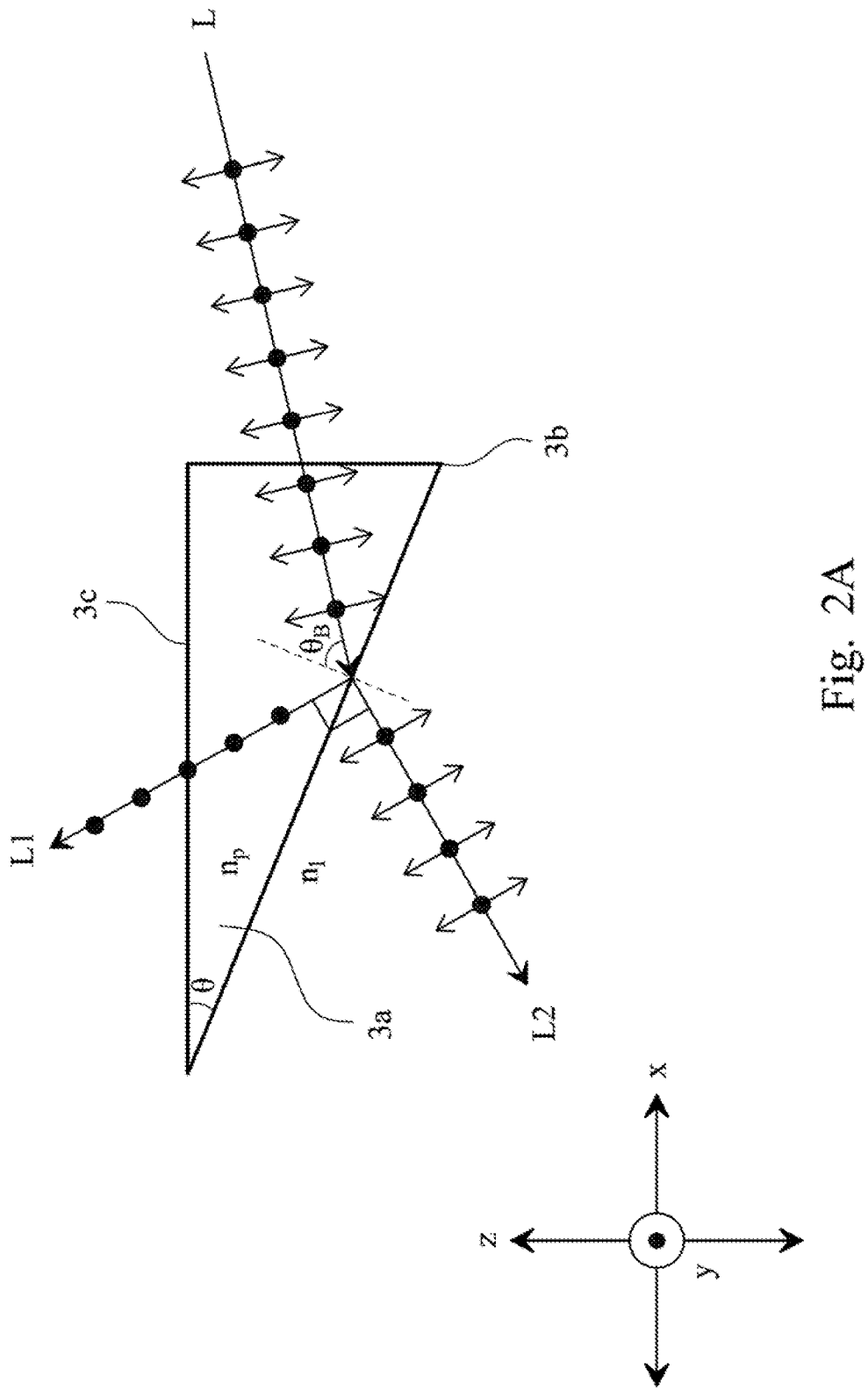
FIG. 2A is a perspective view showing the principle of the strip-shaped prism of the quantum rod light-guide plate generating polarized light in accordance with an embodiment of the present invention.
Figure 2B:
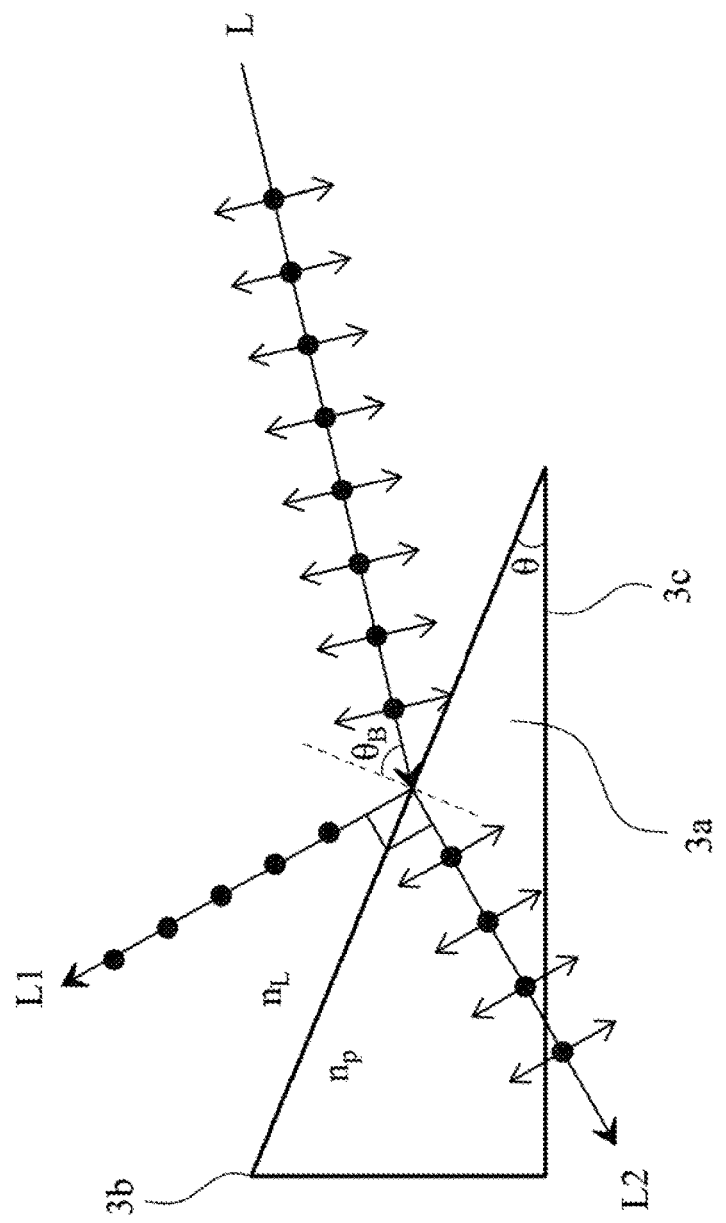
FIG. 2B is a perspective view showing the principle of the strip-shaped prism of the quantum rod light-guide plate generating polarized light in accordance with another embodiment of the present invention.

Referring to FIG. 2A and FIG. 2B, FIGS. 2A and 2B illustrate the principle of the strip-shaped prism 3a of the quantum rod light-guide plate converting the incident light (L) to generate a polarized light. FIG. 2A shows that the strip-shape prisms 3a is adjacent to the light-guide substrate (not shown) by the side of the flat bottom surface 3c. When the incident light (L) emitted from the backlight is transmitted to the strip-shaped prism 3a via the light guide substrate, the incident light (L) can be easily incident on the inclined surface at the Brewster angle ($\theta_B$) by controlling the bevel angle ($\theta$) of the strip-shaped prism 3a to form a completely polarized reflected light (L1) in a direction parallel to the arrangement direction of the plural strip-shaped prisms i.e., the y-axis direction) and a partially polarized refracted light (L2). Since the incident light (L) is incident on the inclined surface of the strip-shaped prism 3a at the Brewster angle ($\theta_B$) the reflected light (L1) is perpendicular to the refracted light (L2), so that the following formulas are obtained according to Snell's Law: $n_p \times \sin(\theta_B) = n_1 \times \sin(90 - \theta_B)$, and $\theta_B = \tan^{-1}(n_1/n_P)$, wherein $n_P$ is the refractive index of the strip-shape prism 3a, at is the refractive index of the outside air in contact with the strip-shaped prism 3a. FIG. 2B shows that the strip-shaped prisms 3a is adjacent to the light-guide substrate (not shown) by the side of the vertex 3b. When the incident light (L) emitted from the backlight is transmitted to the strip-shape prism 3a via the light guide substrate, the Brewster angle ($\theta_B$) is also obtained by the following formula $\theta_B = \tan^{-1}(n_P/n_L)$, wherein $n_L$ is the refractive index of the light-guide substrate. Therefore, when the major axes of the quantum rods included in the quantum rod light, guide plate of the present invention are parallel to the extending direction of the strip-shaped prism 3a, and the strip-shaped prism 3a is adjacent to the light-guide substrate by either the side of the flat bottom surface 3c or the side of the vertex 3b, the reflected light (L1) can enter the quantum rods in the same polarized direction as the direction of the major axes of the quantum rods i.e., the y-axis directions) and increase the efficiency of the quantum rod excited to emit polarized light.

In an embodiment of the quantum rod light-guide plate of the present invention, the refractive index ($n_L$) of the light-guide substrate is between 1.2 and 1.6.

In an embodiment of the quantum rod light-guide plate of the present invention, the refractive index ($n_P$) of the strip-shape prism is between 1.2 and 1.6.

In an embodiment of the quantum rod light-guide plate of the present invention, the included angles ($\theta$) between the inclined surface of the strip-shaped prisms 3a and the plane of the light-guide substrate 2 are between 20° and 60°. Therefore, the included angles ($\theta$) can be adjusted according to the incident angles of the different backlights so that the incident light can be easily incident at the Brewster angle ($\theta_B$).

In an embodiment of the quantum rod light-guide plate of the present invention, the included angles ($\theta$) between the inclined surface of the strip-shaped prisms 3a and the plane of the light-guide substrate 2 vary continuously. Therefore, the incident light can be easily incident at the Brewster angle ($\theta_B$) with different distances between the strip-shaped prisms 3a and the light incident surface 2a.

In an embodiment of the quantum rod light-guide plate of the present invention, the material of the prism layer is selected from a group consisting of glass, polymethyl methacrylate, polyethylene terephthalate, cellulose triacetate polycarbonate, polystyrene, polyolefin and a combination thereof.

In an embodiment of the quantum rod light-guide plate of the present invention, the lengths of the quantum rods 4a are between about 10 nm and 50 nm. The aspect ratios (the ratio of the length to the diameter) of the quantum rods 4a are between 5 and 10.

In an embodiment of the quantum rod light-guide plate of the present invention, the quantum rods 4a include one or more quantum rods with different lengths. By adjusting ratio of the content of quantum rods 4a with different lengths in the quantum rod layer 4, the light from the quantum rod layer 4, which is mixed with the green light and the red 14 light respectively emitted from the quantum rods with different lengths, together with the transmitted blue light from the light source will be adjusted to be the desired white light source for displays. In addition, because the excitation spectrum of the quantum rods material has a narrow full-width-at-half-maximum (FWHM), the gamut area of the display using the quantum rod light-guide plate disclosed herein may be enlarged.

In an embodiment of the quantum rod light-guide plate of the present invention, the quantum rods 4a include one or more semiconductor materials, the material of the quantum rods is a semiconductor material selected from a group consisting of group III-V, group II-VI and group IV-VI compounds and a combination thereof. The semiconductor material includes but not limited to, for example, such as AlN, AlP, AlAs, AlSb, GaN, GaP, GaAs, GaSb, InN, InP, InSb, ZnO, ZnS, ZnSe, ZnTe, CdS, CdSe, CdTe, HgSe, HgTe, PbS, Pbe, PbTe.

In an embodiment of the quantum rod light-guide plate of the present invention, the quantum rod layer 4 is encapsulated by a barrier layer at a side of the quantum rod layer in order to provide a good encapsulation structure for barring the moisture and oxygen to enhance the weatherability and durability of the quantum rod layer 4.

In an embodiment of the quantum rod light-guide plate of the present invention, a material of the barrier layer is selected from a group consisting of polyethylene terephthalate, polymethyl methacrylate, epoxy polymer, polysiloxanes, fluororesin polymer, glass, metal oxide-containing organic/inorganic composite and a combination thereof.

From the foregoing it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A quantum rod light-guide plate including:
   a light-guide substrate having a side as a light incident surface;
   a prism layer disposed on a first surface of the light-guide substrate and comprising a plurality parallel strip-shaped prisms extending along an extending direction parallel to the light incident surface of the light-guide substrate, wherein each of the strip-shaped prisms has a vertex and a flat bottom surface; and
   a quantum rod layer disposed on a second surface of the light-guide substrate opposite to the prism layer, wherein the second surface is a light exiting surface, and the quantum rod layer comprising a plurality of quantum rods, wherein major axes of the quantum rods are aligned with a direction parallel to the extending direction of the parallel strip-shaped prisms.

2. The quantum rod light-guide plate of claim 1, wherein the prism layer is adjacent to the light guide substrate by the side of the vertex of the strip-shaped prisms.

3. The quantum rod light-guide plate of claim 1, wherein the prism layer is adjacent to the light guide substrate by the side of the flat bottom surface of the strip-shape prisms.

4. The quantum rod light-guide plate of claim 1, wherein a refractive index of the light-guide substrate is between 1.2 and 1.6.

5. The quantum rod light-guide plate of claim 1, wherein a refractive index of the strip-shape prism is between 1.2 and 1.6.

6. The quantum rod light-guide plate of claim 1, wherein included angles between the inclined surface of the strip-shaped prisms and the plane of the light-guide substrate are between 20° and 60°.

7. The quantum rod light-guide plate of claim 6, wherein included angles between the inclined surface of the strip-shape prisms and the plane of the light-guide substrate vary continuously.

8. The quantum rod light-guide plate of claim 1, wherein the material of the prism layer is selected from a group consisting of glass, polymethyl methacrylate, polyethylene terephthalate, cellulose triacetate, polycarbonate, polystyrene, polyolefin and a combination thereof.

9. The quantum rod light-guide plate of claim 1, wherein lengths of the quantum rods are between about 10 nm and 50 nm, and aspect ratios of the quantum rods are between 5 and 10.

10. The quantum rod light-guide plate of claim 1, wherein the quantum rods comprise one or more quantum rods with different lengths.

11. The quantum rod light-guide plate of claim 1, wherein the quantum rods comprise at least one semiconductor material, the material of the quantum rods is a semiconductor material selected from a group consisting of group III-V, group II-VI and group IV-VI compounds and a combination thereof.

12. The quantum rod light-guide plate of claim 1, wherein the quantum rod layer is encapsulated by a barrier layer at a side of the quantum rod layer.

13. The quantum rod light-guide plate of claim 12, wherein a material of the barrier layer is selected from a group consisting of polyethylene terephthalate, polymethyl methacrylate, epoxy polymer, polysiloxanes, fluororesin polymer, glass, metal oxide-containing organic/inorganic composite and a combination thereof.

* * * * *